United States Patent
Roth (10) Patent No.: US 10,281,062 B2
(45) Date of Patent: May 7, 2019

(54) VERTICAL COMPRESSION ASSEMBLY AND METHOD OF INSTALLING A VERTICAL COMPRESSION ASSEMBLY

(71) Applicant: Steven A. Roth, Alamo, CA (US)

(72) Inventor: Steven A. Roth, Alamo, CA (US)

( * ) Notice: Subject to any disclaimer, the term of this patent is extended or adjusted under 35 U.S.C. 154(b) by 0 days.

(21) Appl. No.: 14/789,879

(22) Filed: Jul. 1, 2015

(65) Prior Publication Data
US 2017/0002956 A1 Jan. 5, 2017

Related U.S. Application Data

(60) Provisional application No. 62/025,169, filed on Jul. 16, 2014.

(51) Int. Cl.
*F16L 3/20* (2006.01)

(52) U.S. Cl.
CPC ...................... *F16L 3/20* (2013.01)

(58) Field of Classification Search
CPC . F16L 3/133; F16L 3/11; F16L 3/1083; F16L 3/1207; E04B 9/18; E04B 9/20; F16B 2/065; F16B 7/0433
See application file for complete search history.

(56) References Cited

U.S. PATENT DOCUMENTS

| | | | | |
|---|---|---|---|---|
| 545,774 | A * | 9/1895 | Clark | F16L 3/14 248/59 |
| 1,500,306 | A * | 7/1924 | Forward | E21B 17/04 138/108 |
| 3,416,830 | A * | 12/1968 | Karr | B66C 1/00 29/822 |
| 4,036,460 | A * | 7/1977 | Storck | F16L 3/133 248/327 |
| 5,344,108 | A * | 9/1994 | Heath | F16L 3/14 248/300 |
| 6,454,232 | B1 * | 9/2002 | Roth | F16B 2/065 248/226.11 |
| 8,714,865 | B2 * | 5/2014 | Heath | F16L 3/16 248/220.21 |
| 2004/0031887 | A1 * | 2/2004 | Heath | F16L 3/16 248/62 |
| 2005/0189452 | A1 | 9/2005 | Heath | |

OTHER PUBLICATIONS

Eaton's B-Line Business, "Seismic restraints system guidelines", Seismic Brace Components—Tolco Rod Stiffener, Aug. 15, 2013, p. No. 5-7.

(Continued)

*Primary Examiner* — Kimberly T Wood
(74) *Attorney, Agent, or Firm* — Steven R. Vosen (57) ABSTRACT

An apparatus and method for the seismic stabilization of loads supported by hanger rods are presented. The apparatus includes a compression member that is placed in parallel to a hanger rod and which spans, or substantially spans, the distance from the load, which may be a conduit, and the supporting structure. This apparatus may be retrofit onto existing load-bearing hanger rods, or may be included at the time of installation of the conduit. Methods of installation are described that allow for providing additional structural integrity without disassembly of existing supports.

26 Claims, 12 Drawing Sheets

(56) References Cited

OTHER PUBLICATIONS

International Seismic Application Technology (I.S.A.T.), "Application & Design Manual", Stiffening Requirements—Threaded Rod, Second Edition, Apr. 18, 2001, p. G2.
Mason West, Inc., "Seismic Restraint Guidelines for Suspended Distribution Systems", Second Edition, Feb. 20, 2015, pp. 68, 78 and 79.
http://phd-mfg.com/products/pipe-hangers-devices/band-hangers-or-copper-tubing-band-hanger/, Data Sheet.
www.erico.com, Loop Hangers, Swivel Loop Hanger 115, p. 21.
http://www.anvilintl.com/SharedContent/Pdf/Literature_Catalog/Pipe_Hangers.pdf, pp. 20, 21, 24, 36 & 38.
Steven A. Roth, co-pending U.S. Appl. No. 15/052,067, filed Feb. 24, 2016.
Steven Andrew Roth, co-pending U.S. Appl. No. 15/084,484, filed Mar. 30, 2016.
Steven A. Roth, co-pending U.S. Appl. No. 15/018,054, filed Feb. 8, 2016.

* cited by examiner

VERTICAL COMPRESSION ASSEMBLY AND METHOD OF INSTALLING A VERTICAL COMPRESSION ASSEMBLY

This application claims the benefit of U.S. Provisional Application No. 62/025,169, filed Jul. 16, 2014, the contents of which are hereby incorporated by reference in their entirety.

BACKGROUND OF THE INVENTION

Field of the Invention

The present invention relates to an apparatus and method of building construction, and more particularly to an apparatus and method for the seismic stabilization of loads supported by hanger rods.

Discussion of the Background

One common technique of providing services such as plumbing or electrical wiring into the interior of buildings is by way of conduits that hang from structural elements of the building. Thus, for example, electrical conduits, plumbing pipes, sprinkler pipes, mechanical piping systems, and the like, are typically supported at regular intervals by brackets ("hangers") that are attached to building structural elements using threaded rods.

Thus, for example, hangers supported by hanger rods that are typically located throughout a building in the space above the ceiling at spaced-apart locations for supporting conduit that carries a service element and its gravity tension load. In the installation process, the conduit is installed through the hangers, which together form a conduit gravity support assembly.

Figure 1A:
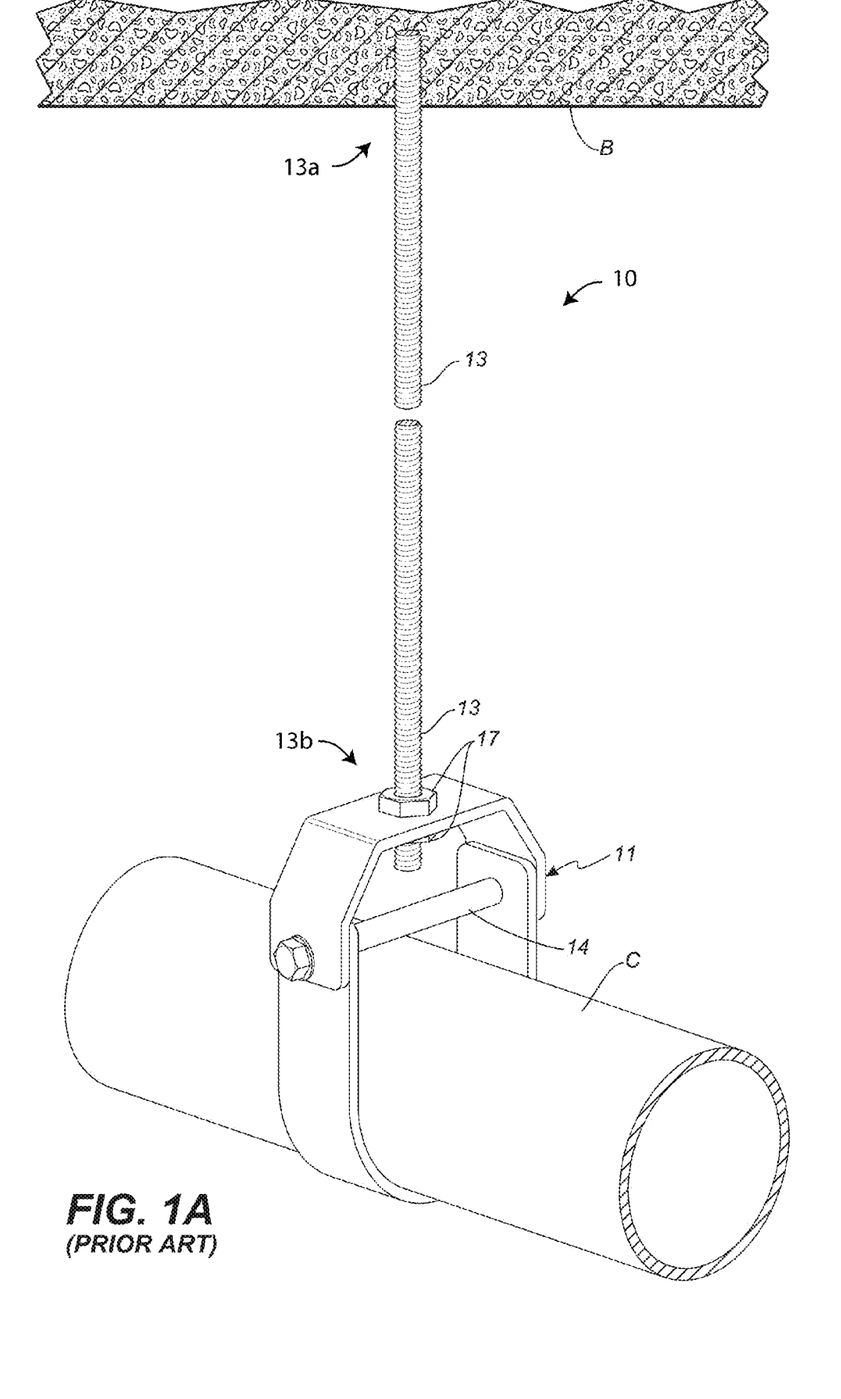
FIG. 1A is a perspective view of a prior art hanger system.
Figure 1B:
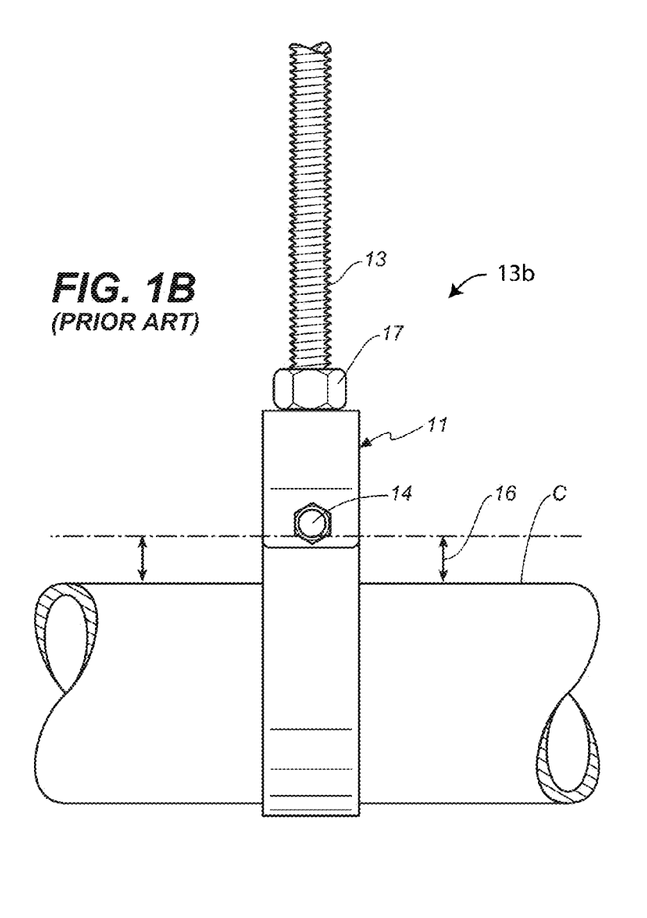
FIG. 1B is a side view of the prior art hanger system of FIG. 1A.
Figure 1C:
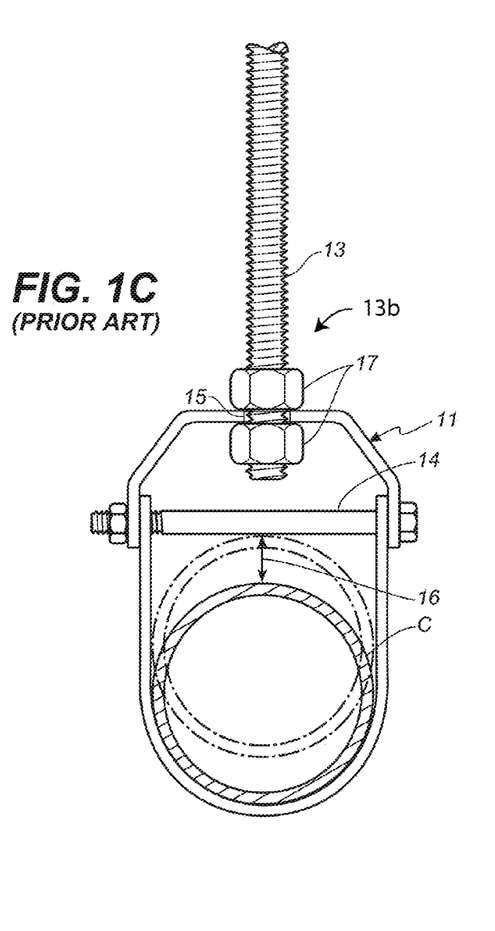
FIG. 1C is an end view of the prior art hanger system of FIG. 1A.

A prior art hanger system 10 for supporting a conduit 12 from the underside of an overhead building structure B is illustrated in FIGS. 1A, 1B and 1C as a perspective view, side view, and end view, respectively. Hanger system 10 includes a hanger rod 13 and a hanger 11. Hanger rod 13 has an upper end 13a that, as shown in the Figures, can be attached to or otherwise supported by the underside of an overhead building structure B, and a lower end 13b that passes through a hole 15 in hanger 11 and which is held in place by a pair of nuts 17.

Typically, hanger 11 is sized with an interior that is larger than conduit C, having a diameter D, such that the conduit can be easily placed and rest within the hanger, with the distance between the underside of an overhead building structure B and conduit C adjustable according to the location of nuts 17 on hanger rod 13. As illustrated in FIGS. 1A-1C, there is some space about conduit C that can result in the movement of the conduit in hanger 11. Thus, for example, space ("slop") 16 exists between conduit C and an upper member 14 of hanger 11. In the case of a seismic event, conduit C may move rapidly upwards and be forced against an upper member 14, with a force on hanger rod 13, as illustrated in FIG. 1C. This can result in a large and unpredictable force being transferred as a compressive force into hanger rod 13, with potential destructive results. To prevent such seismic damage, some building codes now prohibit the use at seismic restraint locations of hangers that include slop.

Attempts to provide hangers that are less prone to damage from earthquakes, have limited success or are difficult of implement in all configurations. One device for reducing seismic damage is the adding of a compression resistance element in the form of a stiffened element that is coupled to hanger rod 13. See, for example, co-owned U.S. Pat. No. 7,188,809, which is incorporated herein by reference. This device strengthens the hanger to absorb seismic loads.

Another way to reduce seismic damage is to put an element within the slop space. Thus, for example, placing a spacer into the slop space prevents impact, but does not strengthen the hanger rod. See, for example, U.S. Pat. No. 5,344,108. Further, the hardware necessary to provide conduit restraint depends on the size and shape of the conduit and hanger, and is not generically useful in all cases.

There is a need in the art for a device and method for reducing failure of hanger system. Such a device should be inexpensive and useful for a wide range of conduit and hanger sizes. The method should be easy to implement and useful as an add-on to existing hangers.

BRIEF SUMMARY OF THE INVENTION

Embodiments presented herein overcome the disadvantages of prior art by providing a compression member to an assembly for supporting an accepted load from a structure.

In one embodiment, an assembly is described that eliminates the potential damage resulting from hanger slop and provides compression resistance that does not depend on the hanger rod thereby eliminating the need for hanger rod stiffeners. In addition, the assembly utilizes as its main compression member a length of any one of several sizes of strut, pipe or tube materials that are commonly available in the construction of a building.

One embodiment provides an apparatus for use with a hanger assembly that supports a load from the underside of an overhead building structure. The hanger assembly includes one or more hangers each including a rod attached to the hanger and to the overhead building structure. The apparatus includes a compression member having length between a first end and a second end, where the first end contacts or is near the accepted load, and where the second end contacts or is near the underside of the overhead building structure. If the accepted load moves towards the overhead building structure, some or all of the resulting compression force in the hanger assembly is transferred to the compression member.

Another embodiment provides an apparatus that supports a load from the underside of an overhead building structure using one or more hangers. At least one hanger is adapted to accept a portion of the load and is attachable to the underside of an overhead building structure. The apparatus includes: a rod connecting at least one hanger to the overhead building structure, where the length of a rod of the plurality of rods between the accepted load and the underside of the overhead building structure is adjustable; and a compression member having length between a first end and a second end. The length between the accepted load and the underside of the overhead building structure of the rod of the plurality of rods is adjustable to a first rod length, wherein that the first end contacts or is near the accepted load and wherein that the second end contacts or is near the underside of the overhead building structure. Further, if the accepted load moves towards the overhead building structure, some or all of the resulting compression force in the hanger assembly is transferred to the compression member.

Yet another embodiment provides a method of reinforcing a hanger assembly that accepts and supports a load on the underside of an overhead building structure with a compression member having a length between a first end and a second end. The hanger assembly includes one or more hangers each including a rod attached to the hanger and to the overhead building structure, where the hanger is positioned to accept a portion of the load. The method includes: adjusting the position of the hanger on the rod, such that the distance between the accepted conduit and the underside of the overhead building structure is greater than the length of the compression member; positioning the compression member to be parallel to the rod; and adjusting the position of the hanger on the rod such that the first end contacts or is near the accepted load and the second end of the compression member contacts or is near the underside of the overhead building structure.

Alternative embodiments may also provide for one or more devices to align the compression member with the rod; a compression member having a cross-sectional shape of a c-channel or a hollow cylinder; and a mechanism to adjust the length of the compression member.

Embodiments described herein include an assembly that eliminates the potential damage in a hanger system associated with slop, and provides superior vertical compression resistance. This may be accomplished as a retrofit to commonly used hanger rods and hangers These features together with the various ancillary provisions and features which will become apparent to those skilled in the art from the following detailed description, are attained by the hanger assembly, system, and method of the present invention, preferred embodiments thereof being shown with reference to the accompanying drawings, by way of example only, wherein:

BRIEF DESCRIPTION OF THE SEVERAL VIEWS OF THE DRAWING

FIGS. 9A, 9B, and 9C are side views of alternative embodiments of the compression member where the length of the compression member is less than the spacing between the conduit and the underside of an overhead building, where

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 2:
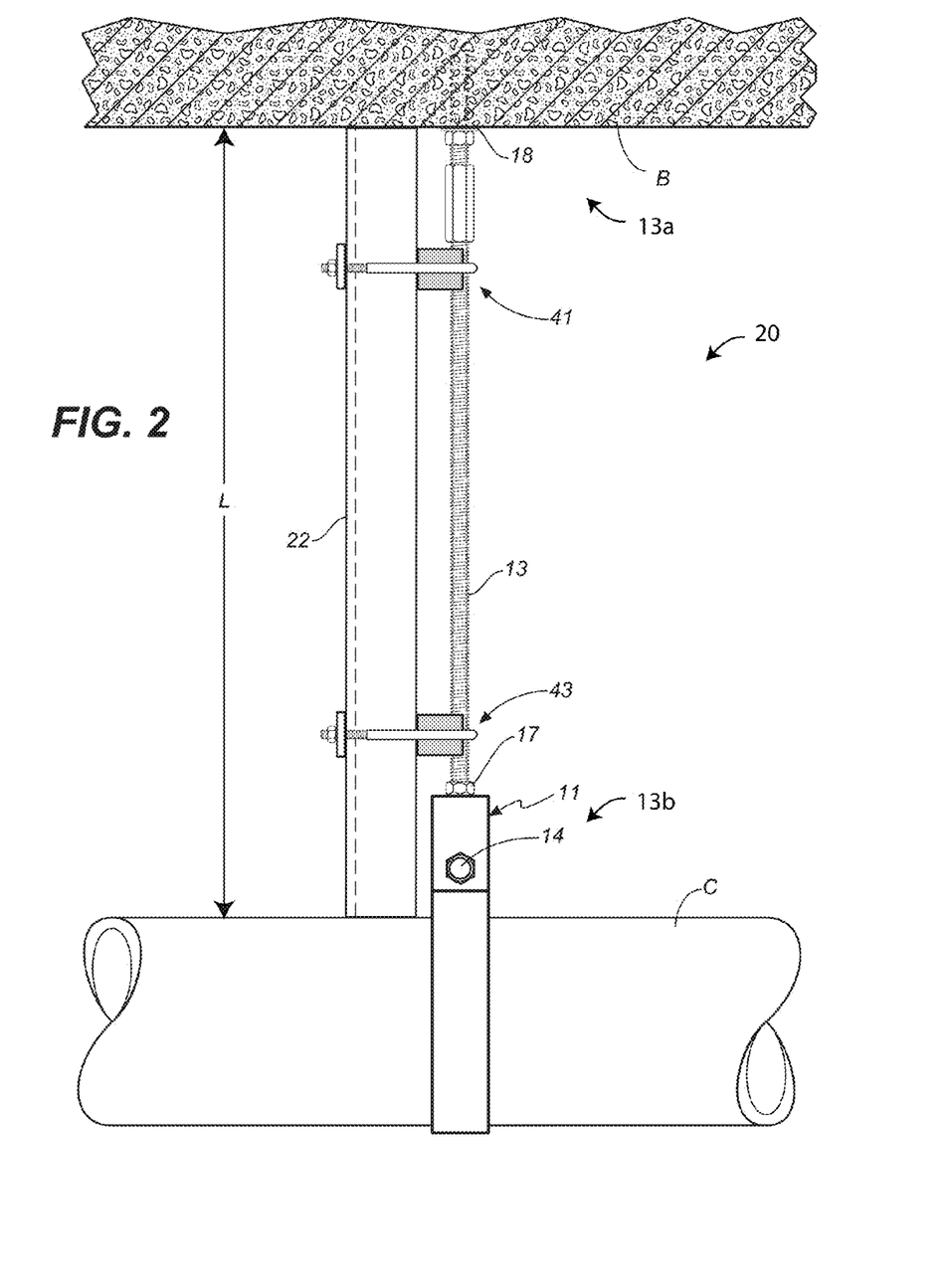
FIG. 2 is a side view of a first embodiment of a hanger system.
Figure 2A:
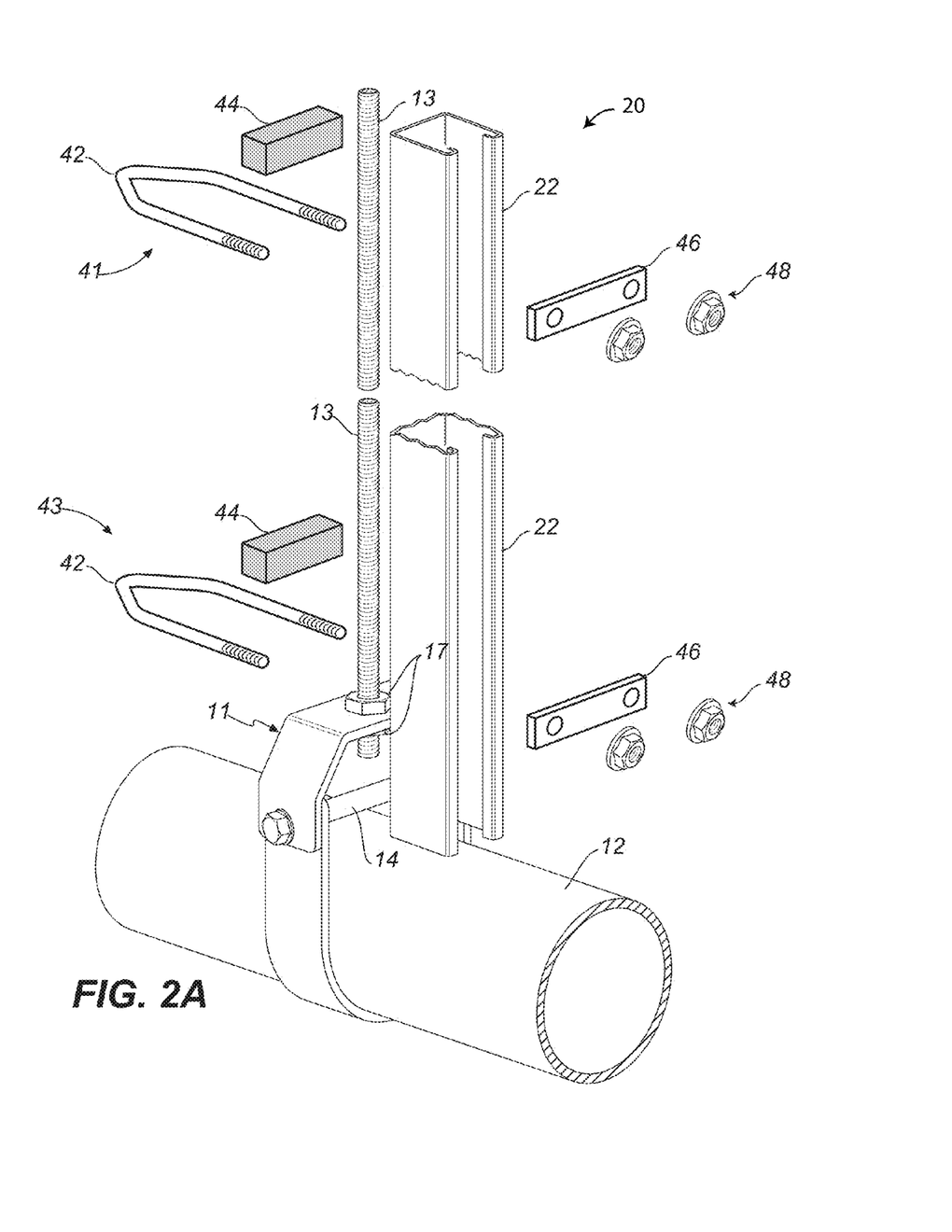
FIG. 2A is an exploded perspective view of the hanger system of FIG. 2.
Figure 2B:
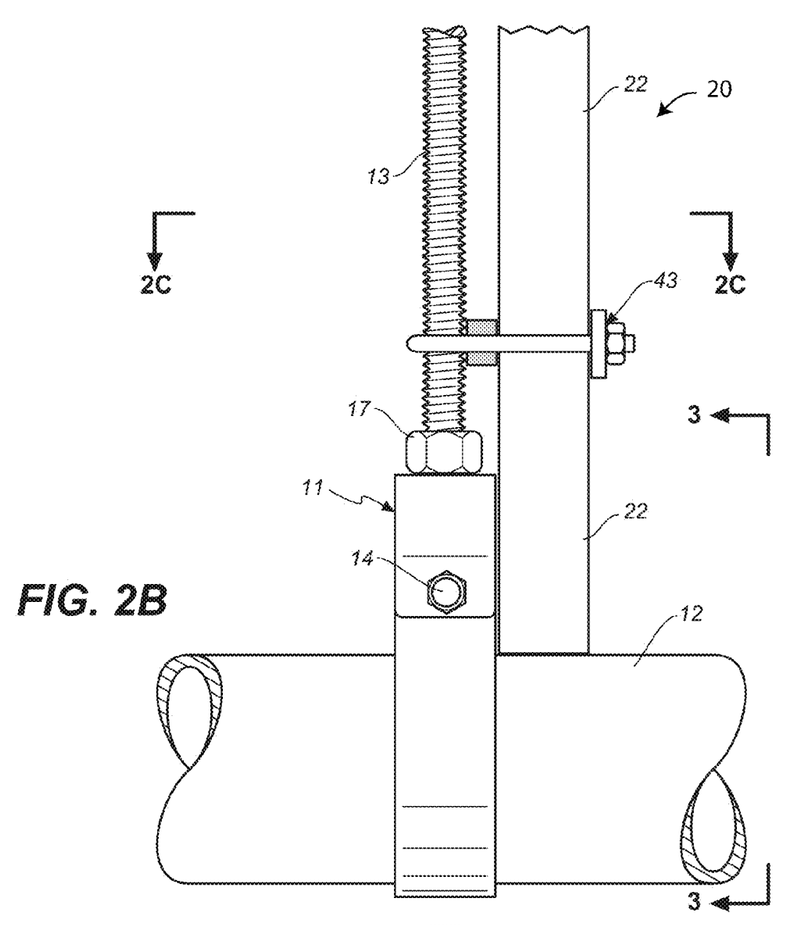
FIG. 2B is a side view of the hanger system of FIG. 2.
Figure 2C:
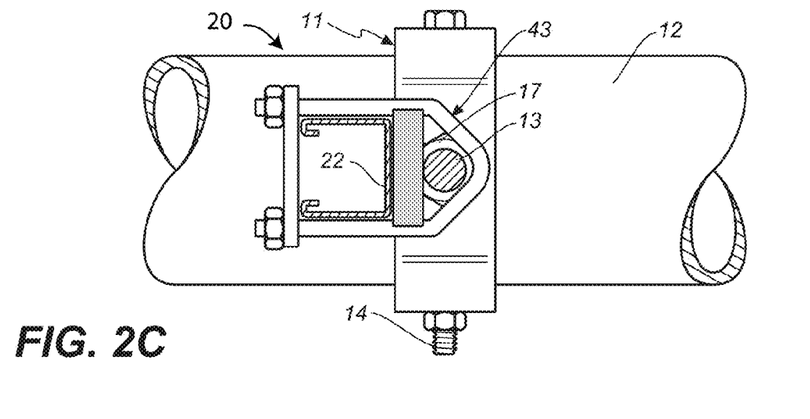
FIG. 2C is a top sectional view 2C-2C of FIG. 2B.

The following description provides embodiments of methods and apparatus that provide for improved compression loading of a hanger assembly. One example of a first embodiment hanger system 20 is shown in FIGS. 2, 2A, 2B, and 2C, where FIG. 2A is an exploded perspective view of the hanger system of FIG. 2, FIG. 2B is a side view of the hanger system of FIG. 2, and FIG. 2C is a top sectional view 2C-2C of FIG. 2B. Hanger system 20 may be an add-on to hanger system 10, and thus includes the components of hanger system 10 to support a load C from the underside of an overhead building structure B, and also includes a compression member 22 and an upper attachment 41 and a lower attachment 43.

While embodiments are illustrated with hanger assembly 20 supporting a load C having a generally circular cross-section, his shape is not a limitation of an application of the present invention. The load accepted by hanger assembly 20 is also referred to in general herein as a conduit.

As described subsequently, compression member 22 works in parallel with hanger rod 13 to support conduit C to transfer loads between the conduit and the underside of an overhead building structure B. In the absence of an upwards force on conduit C, as may occur during a seismic event, the weight of hanger 11 and conduit C are supported by hanger rod 13, which is in tension. In the presence of an upwards force of conduit C, compressive forces in hanger system 20 are transferred to compression member 22, which also restrains movement of conduit C in hanger 11.

As shown in FIG. 2, hanger rod 13 is attached to hanger 11, which can accept conduit C, which is supported at a distance L from the underside of an overhead building structure B. Hanger rod 13 is shown as being affixed, at attachment point 18 to the underside of an overhead building structure B (also referred to herein as the plane of support of the tension load) in any number of ways that are well known in the art and which do not form a part of the invention. Inventive hanger system 20 includes a compression member 22 that is attached to hanger rod 13 and spans the distance L from the underside of an overhead building structure B to conduit C. Compression member 22 is parallel to hanger rod 13, and is shown as being attached to the hanger rod by upper attachment 41 and lower attachment 43, Details of hanger system 20 are shown, for example, in FIG. 2A. Compression member 22 is a length L of strut/channel, which may be, for example, UNISTRUT® (Unistrut International Corp., Nevada). Alternatively, compression member 22 may be channel of different geometry, a length of pipe or other material capable of providing the required compression resistance. FIG. 2A also shows that upper attachment 41 and lower attachment 43 are of generally similar construction, including a doubly threaded element 42, an optional spacer 44, a plate 46, and a pair of nuts

48. As shown in FIGS. 2, 2B, and 2C, attachments 41 and 43 thus align compression member 22 with hanger rod 13.

In general, compression member 22 of hanger system 20 spans all, or most all, of the distance between the conduit C and the plane of support, which is the underside of an overhead building structure B. This placement of compression member 22 accomplishes two functions. First, compression member 22 greatly restricts or prevents movement of conduit C in hanger 11. Second, in the event of an upwards force on conduit C, compression forces are transferred compression member 22.

The installation of compression member 22 is facilitated by the threaded hanger rod 13 and nuts 17, which allows the hanger 11 and any conduit C contained therein to be raised or lowered on the hanger rod 13. Thus, for example, one method of installing hanger system 20 first locates hanger 11 on the hanger rod 13 so that the distance between the conduit C and the plane of support B is greater than the length, L, of the compression member 22, thus allowing compression member to be easily placed between the conduit and plane of resistance. Once so placed, upper attachment 41 and lower attachment 43 are used to secure compression member 22 to hanger rod 13. The attachments 41 and 43 can be of the common type illustrated in FIGS. 2A-C, and may include an optional spacer 44, which aligns the compression member 22 vertically and outboard of the hanger 11. Alternative attachment devices 41 and/or 43 may be used to secure hanger rod 13 and compression member 22.

Once compression member 22 is secured in place with attachments 41 and 43, nuts 17 can be moved along hanger rod 13 to raise hanger 11 to a position where the compression member fits against conduit C. In one embodiment, compression member 22 is tightly wedged between the conduit C and the plane of resistance B. When so installed, compression member 22 provides compression resistance to hanger system 20 in a seismic event, in place of hanger rod 13. With compression member 22 so situated, there is no need to give seismic compression design consideration and/or to increase the compression resistance of hanger rod 13, such as by the addition of a rod stiffener mechanism. Compression member 22 so situated also prevents the conduit C from moving within hanger 11, as occurs within slop space 16 of prior art hanger systems.

In summary, hanger system 20 (a) eliminates the potential damage and/or non-seismic design conformance from having in hanger 11; (b) provides code complying compression resistance; and, (c) eliminates the need for separate rod stiffener elements.

Figure 3A:
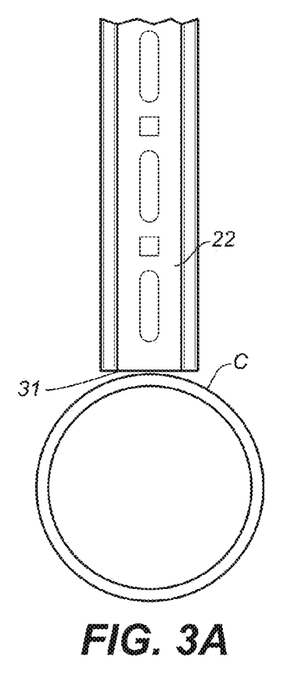
FIGS. 3A-3C are end views 3-3 of FIG. 2B illustrating three alternative embodiments of the shape of the compression member where it contacts the conduit.
Figure 3B:
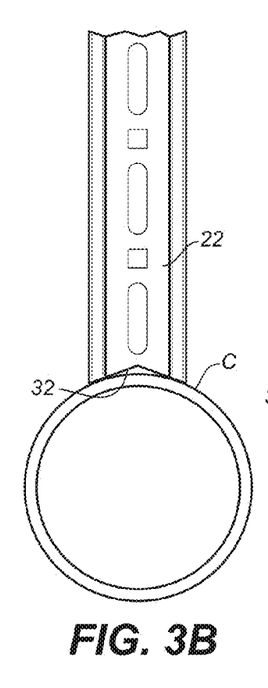
Figure 3C:
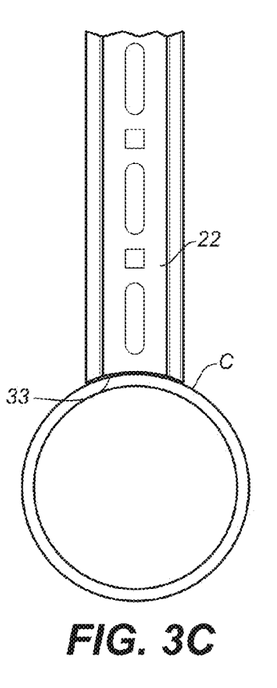

FIGS. 3A-3C are end views 3-3 of FIG. 2B illustrating three alternative embodiments of the shape of the compression member 22 where it contacts or is near the conduit C. FIG. 3A shows the compression member 22 with a square cut bottom 31, in which case only a small part of the bottom is in contact with the conduit C. FIG. 3B illustrates an embodiment in which the bottom of the compression member 22 has a V-cut 32, which places more of its bottom surface in contact with the conduit C and thereby distributing compression forces over a greater area of the conduit. FIG. 3C illustrates a bottom cut 33 to match the arc of the conduit and thereby put the entire bottom surface in contact with the conduit.

Figure 4A:
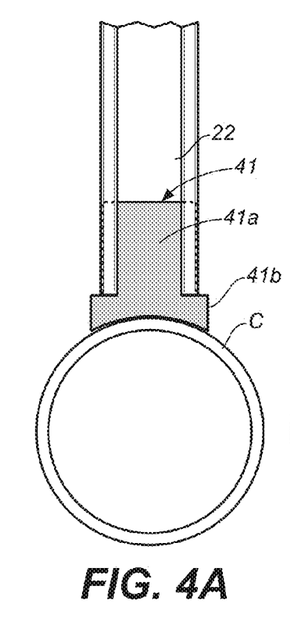
FIGS. 4A and 4B are end views 3-3 illustrating additional alternative embodiments for distributing the load over the surface of the conduit without the necessity of shaping the bottom of the compression member.
Figure 4B:
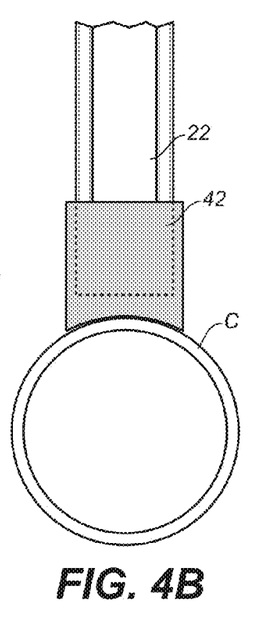

FIGS. 4A and 4B are end views 3-3 of FIG. 2B illustrating additional alternative embodiments which transfer the load over the surface of the conduit C without the necessity of shaping the bottom of the compression member 22. In the embodiment of FIG. 4A, a member 41 has an upper part 41a that is sized to fit into the lower portion of compression member 22, and lower part 41b that is larger than the interior of compression member 22 and has an arc shaped bottom surface that matches the curvature of the conduit C. FIG. 4B illustrates another embodiment in which a sleeve 42 has an interior space sized to receive a portion of the bottom of compression member 22 and an arc shaped bottom surface that matches the curvature of the conduit C.

In addition to providing a more secure interface between compression member 22 and conduit C and distributing the load on the conduit, members 41 or 42 can also provide the adjustability previously described in connection with connection nuts 17, for providing a wedge fit for the compression member 22. Moreover, the members 41 or 42 can be located at the top of the compression member 22 with or without similar members at the bottom.

While compression member 22 is illustrated as a single member in FIG. 2, the invention includes other embodiments where the compression member is comprised of two or more members. These embodiments are illustrated in FIGS. 5A, 5B, 6A, 6B, 7A, 7B and 8, which also illustrate alternatives to attachments 41 and 43 as well as an embodiment where the attachments do not include a spacer.

Figure 5A:
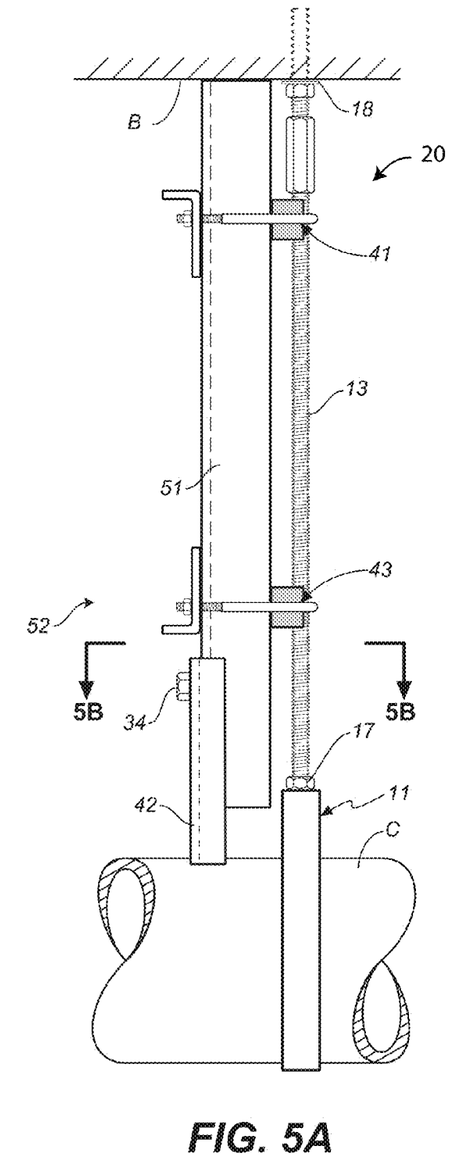
FIG. 5A is a side view and FIG. 5B is view 5B-3B of FIG. 5A which illustrate an alternative hanger system which includes alternative compression member.
Figure 5B:
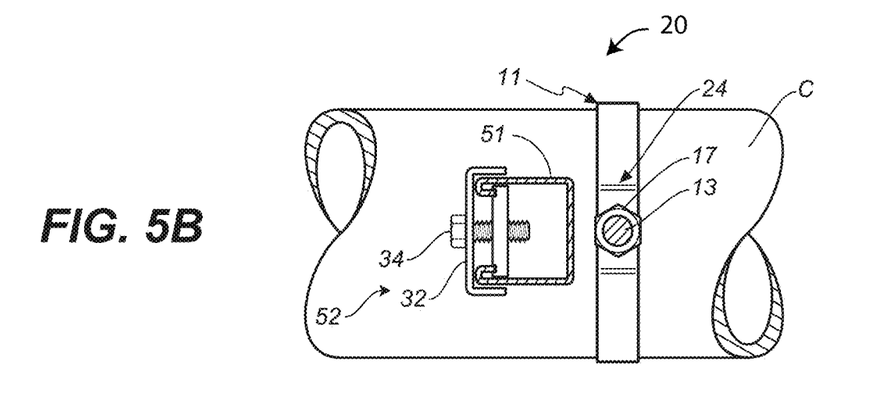

FIG. 5A is a side view and FIG. 5B is view 5B-3B of FIG. 5A which illustrate an alternative hanger system 20 which includes alternative compression member 52. The embodiment of FIGS. 5A and 5B is generally similar to the embodiment of FIG. 2, and may include embodiments as illustrated in any one of FIG. 3A, 3B, 3C, 4A, or 4D, except as explicitly stated.

Compression member 52 is formed from the combination of a strut 51 and a member 42 that is affixed to the strut, at an adjustable position, with bolt 34. Strut 51 may be, for example a length of the strut forming compression member 22. The length of compression member 52 may thus be adjusted to span the distance and form a wedge fit between conduit C and the underside of an overhead building structure B, and thus provide the same combined conduit restraint and compression loading as compression member 22.

Figure 6A:
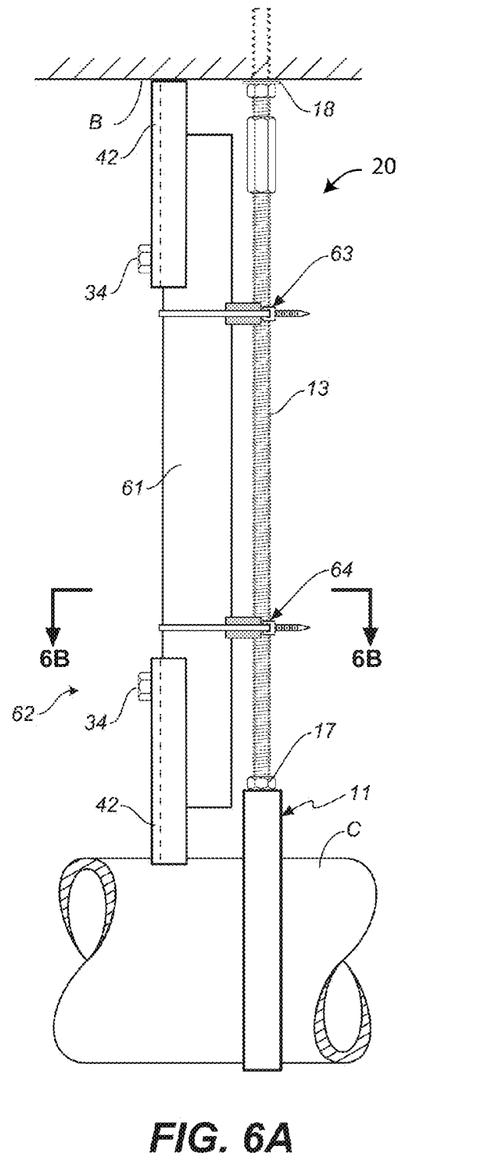
FIG. 6A is a side view and FIG. 6B is view 6B-6B of FIG. 6A which illustrate an alternative hanger system which includes alternative compression member.
Figure 6B:
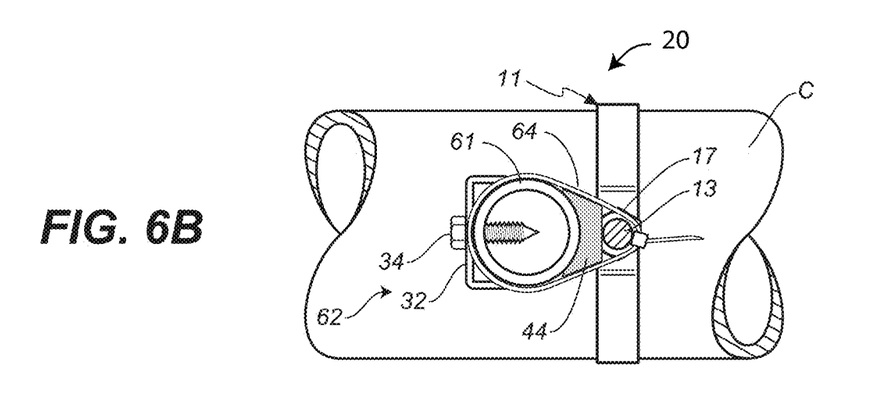

FIG. 6A is a side view and FIG. 6B is view 6B-6B of FIG. 6A which illustrate an alternative hanger system 20 which includes alternative compression member 62. The embodiment of FIGS. 6A and 6B is generally similar to the embodiment of FIGS. 2 or 5A and 5B, and may include embodiments as illustrated in any one of FIG. 3A, 3B, 3C, 4A, or 4D, except as explicitly stated.

Compression member 62 is formed from the combination of a pipe 51, and pair of members 42 each affixed to and end of the pipe, at an adjustable position, with a corresponding bolt 34. With members 42 at both ends of pipe 51, the length of compression member 62 may thus be adjusted using either or both of the members to span the distance and form a wedge fit between conduit C and the underside of an overhead building structure B, and thus provide the same combined conduit restraint and compression loading as compression member 22. The embodiment of FIGS. 6A and 6B also includes cable ties which are uses as an upper attachment 63 and a lower attachment 64 to secure spacers 44.

Alternatively, compression member 52 or 62 may be adjusted to have a length that is less than the distance between conduit C and the underside of an overhead building structure B, as discussed subsequently with reference to FIGS. 9A-9C, such that, there is a gap between one or both ends of the compression member and conduit and the underside of an overhead building structure.

Figure 7A:
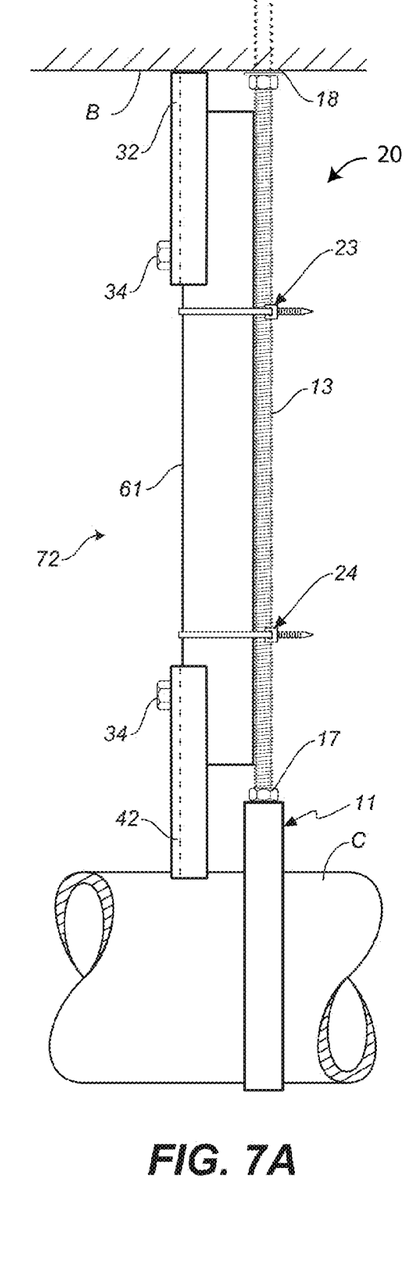
FIG. 7A is a side view and FIG. 7B is view 7B-7B of FIG. 7A which illustrate an alternative hanger system which includes alternative compression member.
Figure 7B:
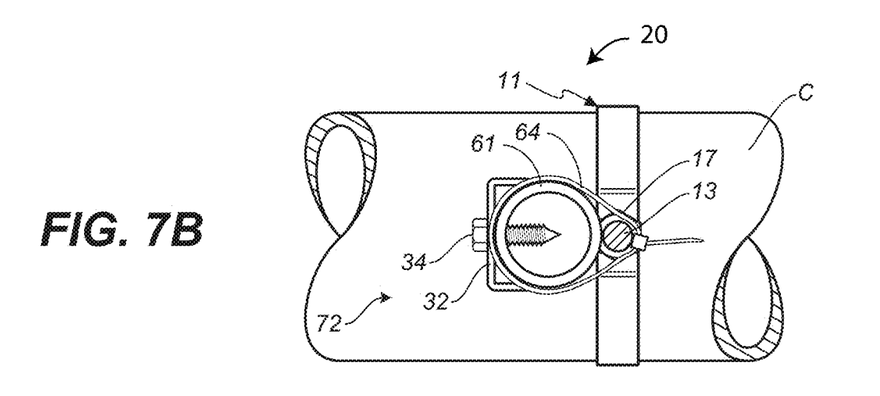

FIG. 7A is a side view and FIG. 7B is view 7B-7B of FIG. 7A which illustrate an alternative hanger system 20 which includes alternative compression member 72. The embodiment of FIGS. 7A and 7B is generally similar to the embodiment of FIG. 2, FIGS. 5A and 5B, or FIGS. 6A and 6B, and may include embodiments as illustrated in any one of FIG. 3A, 3B, 3C, 4A, or 4D, except as explicitly stated.

The embodiment of FIGS. 7A and 7B is generally similar to that of FIGS. 6A and 6B, except that spacers 44 are not included, and the figures illustrate how members 32 can be disposed to align the compression member 61 outboard of hanger 11 without a spacer.

Figure 8:
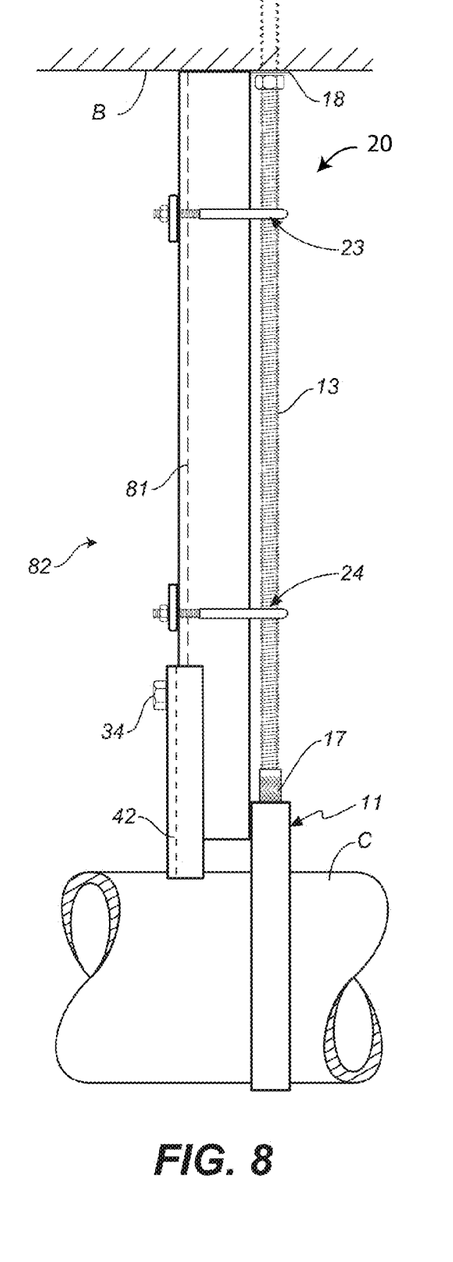
FIG. 8 is a side view which illustrates an alternative hanger system without a spacer.

FIG. 8 is a side view which illustrates an alternative hanger system 20. The embodiment of FIG. 8 is generally similar to the embodiment of FIGS. 5A and 5B, without the use of a spacer.

In alternative embodiments, a length, M, of the compression member 92 is less than the distance, L, between conduit C and the underside of an overhead building structure B. FIGS. 9A, 9B, and 9C are side views of alternative embodiments, where FIG. 9A illustrates an end 93 of the compression member 92 contacting conduit C, and the other end 91 of the compression member near the underside of an overhead building B; FIG. 9B illustrates end 93 near the conduit and end 91 contacting the underside of an overhead building; and FIG. 9C illustrates both ends 91 and 93 near, but not contacting either the conduit or the underside of an overhead building. Compression member 92 may be, for example and without limitation, similar to one of compression members 22, 52, or 62, and ends 91 and 93 are two distal ends of the compression member, which may include, for example, members 42.

Figure 9A:
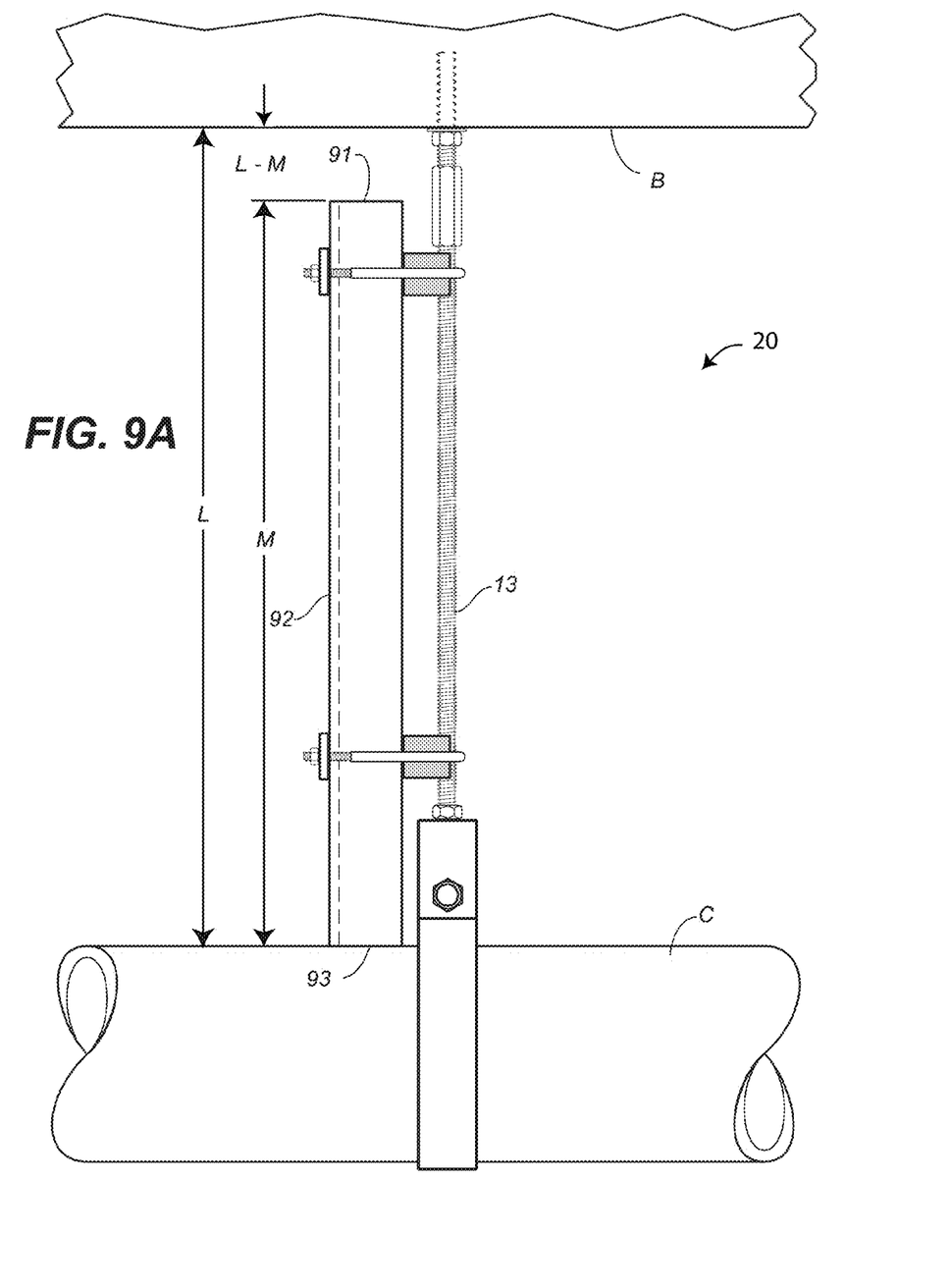
FIG. 9A illustrates one end of the compression member contacting the conduit and the other end of the compression member near the underside of an overhead building.
Figure 9B:
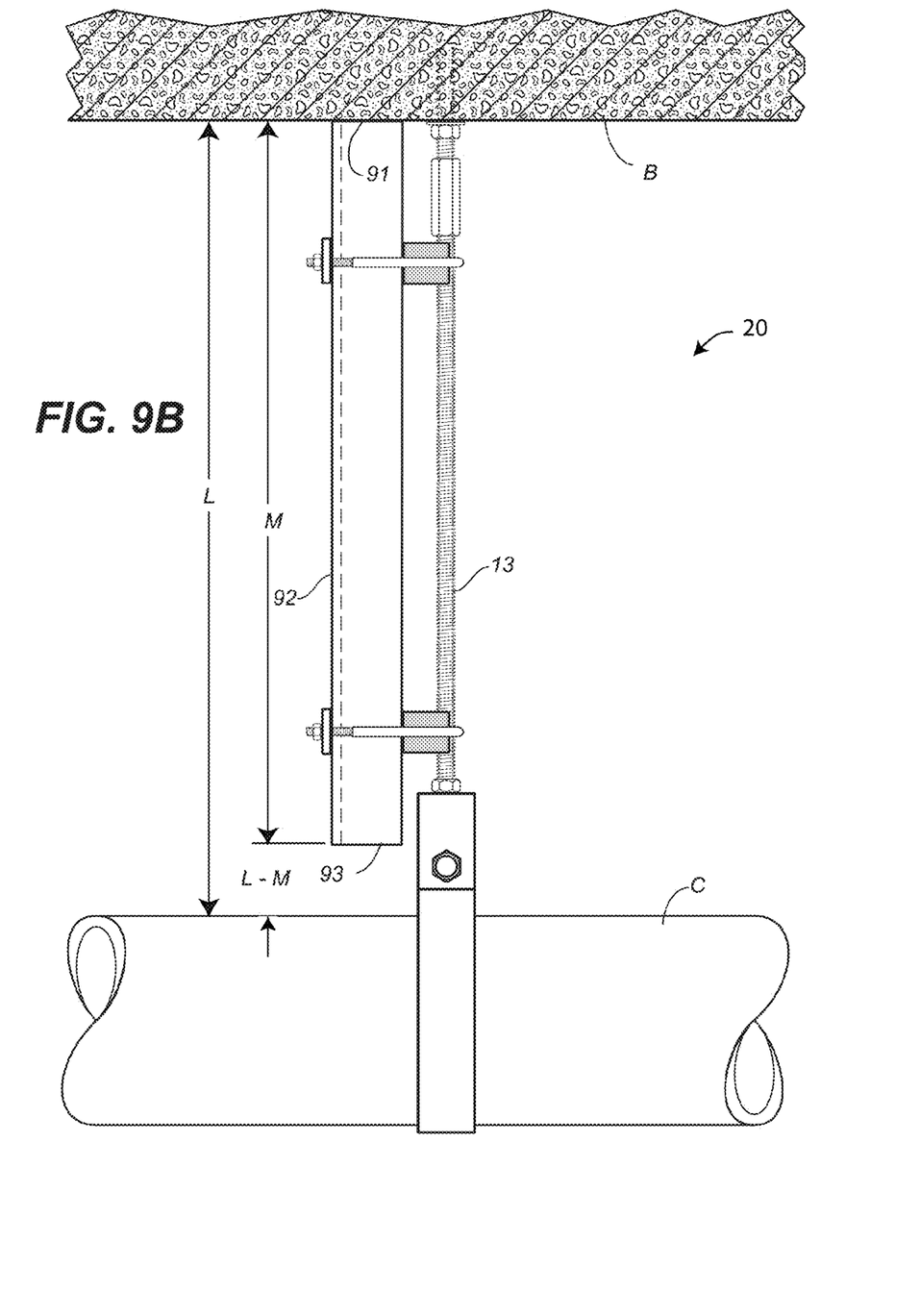
FIG. 9B illustrates one end of the compression member near the conduit and the other end of the compression member contacting the underside of an overhead building.
Figure 9C:
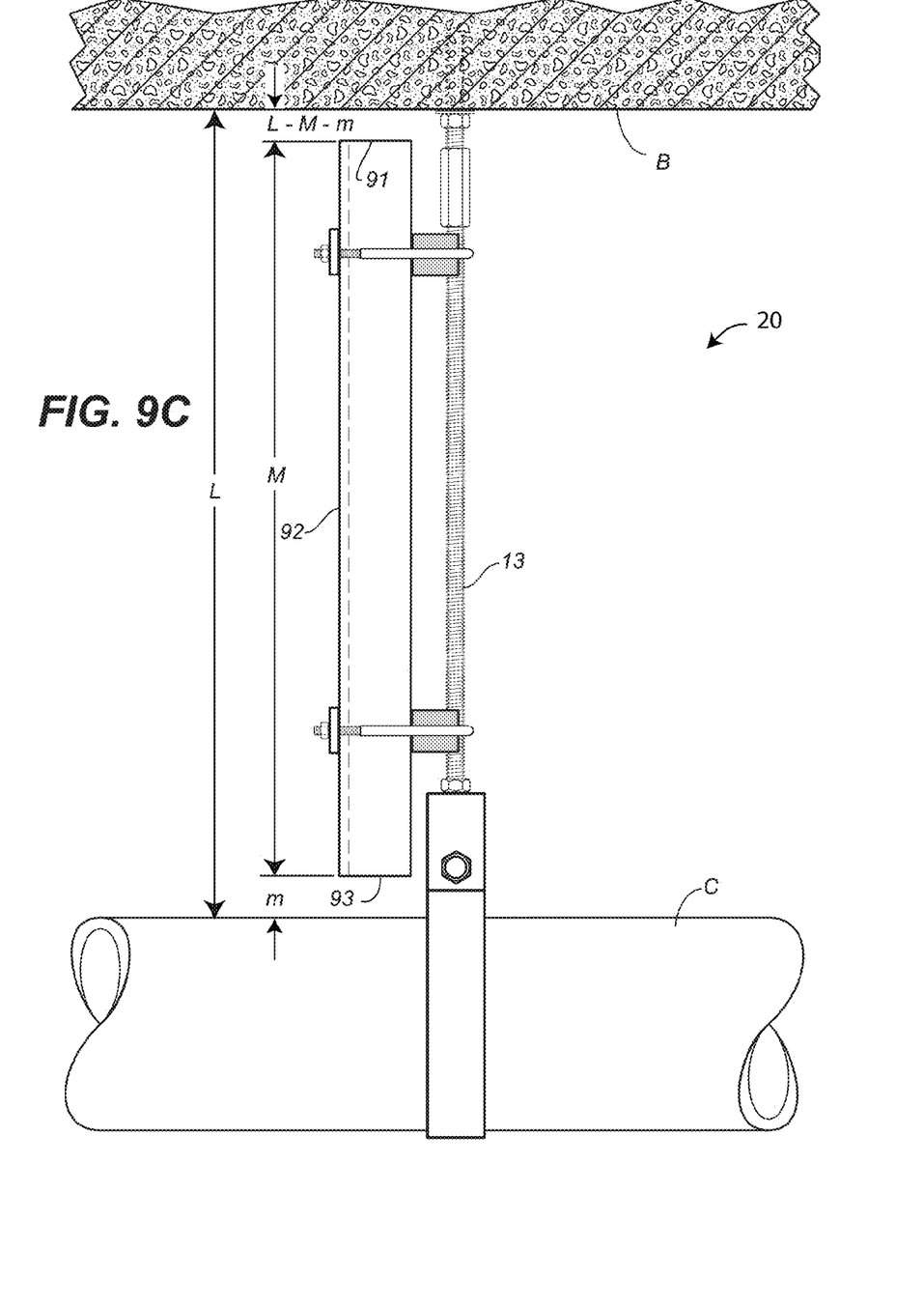
FIG. 9C illustrates both ends of the compression member near, but not contacting either the conduit or the underside of an overhead building.

In the embodiments of FIGS. 9A, 9B, and 9C, there is a total gap (L−M), which is equal to the difference between the length, L, between conduit C and the underside of an overhead building structure B, and the length M of compression member 92. In various embodiments, the gap (L−M) may be, for example, approximately 1/32 inch, 1/16 inch, 3/32 inch, 1/8 inch, or may be more than 1/8 inch. Importantly, the gap is small enough so that compression member 92 accepts the upwards force from hanger rod 13 before the hanger rod suffers permanent deformation or degradation of structural integrity. Thus, in event of an upward force on hanger system 20, hanger rod 13 will initially take up the compression load. If the force is sufficient, the hanger rod will deform such that compression member 92 contacts both conduit C and the underside of an overhead building structure B, and thus the compressive load in the hanger rod will be transferred to the compression member.

For any of the embodiments of FIG. 2, 5A, 5B, 6A, 6B, 7A, 7B, 8, 9A, 9B, or 9C, compression member 22/52/62/92 restricts or prevents the conduit C from moving within hanger 11, thereby minimizing or preventing an impact compression force, as may occur in a seismic event, or any other non-trivial compression force, on hanger rod 13. For embodiments where compression member 22/52/62 contacts conduit C and the underside of an overhead building structure B, movement of conduit C in hanger 11 is minimal and compression within hanger rod 13 is transferred nearly instantly to compression member 22/52/62. For embodiments where compression member 92 does not contact both conduit C and the underside of an overhead building structure B, movement of conduit C in hanger 11 will be limited by the compression member 92, as will compression within hanger rod 13.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

I claim:

1. An apparatus for use with a hanger assembly that supports a load from an underside of an overhead building structure, where the hanger assembly includes one or more hangers each including a rod having a first end attached to the hanger and a second end attached to the overhead building structure, where the hanger supports the load at a position below the first end of the rod, said apparatus comprising:

a compression member, where said compression member is parallel to and clamped to the rod and has a length between a first end and a second end, where said first end of said compression member extends below the first end of said rod to a position that contacts or is near the accepted load, and where said second end of said compression member contacts or is near the underside of the overhead building structure, such that, when the accepted load moves towards the overhead building structure, said compression member contacts both said accepted load and said underside of the overhead building structure, such that at least a portion of the resulting compression force in the hanger assembly is transferred to said compression member.

2. The apparatus of claim 1, further comprising:
one or more devices to align said compression member with the rod.

3. The apparatus of claim 2, where said one or more devices surround the compression member and the rod.

4. The apparatus of claim 2, where said one or more devices includes a first device at a first location on said compression member proximal to the underside of the overhead building structure and a second device at a second location proximal to the accepted load.

5. The apparatus of claim 1, wherein the load includes an elongated member having a circular outer surface.

6. The apparatus of claim 5, wherein said elongated member is a conduit, a pipe, or a tube.

7. The apparatus of claim 1, wherein:
said first end of said compression member contacts the accepted load; and
said second end of said compression member contacts the underside of the overhead building structure.

8. The apparatus of claim 1, wherein said apparatus has a first configuration wherein either:
   1) said first end of said compression member does not contact the accepted load or
   2) said second end of said compression member does not contact the underside of the overhead building structure, such the resulting compression force is within the rod, and a second configuration wherein said first end of said compression member contacts the accepted load and said second end of said compression member contacts the underside of the overhead building structure, such that at least some of the resulting compression force is within the compression member.

9. The apparatus of claim 8, wherein, when the apparatus is in the first configuration and the accepted load moves toward the overhead building structure, the resulting compression force in the rod deforms the rod such that the apparatus moves from said first configuration into said second configuration.

10. The apparatus of claim 1, further including a spacer positioned between said compression member and said rod, such that said compression member does not contact the hanger.

11. The apparatus of claim 1, where, said compression member has a cross-sectional shape of a c-channel or a hollow cylinder.

12. The apparatus of claim 1, where said compression member includes mechanism to adjust the length between said first end and said second end.

13. The apparatus of claim 12, wherein said mechanism includes a mechanism one of said first end or said second end.

14. The apparatus of claim 13, wherein said mechanism includes a mechanism at said first end and said second end.

15. An apparatus that supports a load from an underside of an overhead building structure said apparatus comprising:
a hanger adapted to accept the load;
a rod having a first end attached to said hanger and a second end attached to the overhead building structure;
a compression member, where said compression member is parallel to and clamped to the rod and has a length between a first end and a second end, where said first end of said compression member extends below the first end of the rod and contacts or is near the accepted load, and wherein that said second end of said compression member contacts or is near the underside of the overhead building structure; and a spacer positioned between said compression member and said rod, such that said compression member does not contact the hanger, and
such that, when the accepted load moves towards the overhead building structure, said compression member contacts both said accepted load and said underside of the overhead building structure, such that some or all of the resulting compression force in the hanger assembly is transferred to said compression member.

16. The apparatus of claim 15, further comprising:
one or more devices to align said compression member with the rod.

17. The apparatus of claim 16, where said one or more devices surround the compression member and the rod.

18. The apparatus of claim 16, where said one or more devices includes a first device at a first location on said compression member proximal to the overhead building structure and a second device at a second location proximal to the accepted load.

19. The apparatus of claim 15, wherein the load includes an elongated member having a circular outer surface.

20. The apparatus of claim 19, wherein said elongated member is a conduit, a pipe, or a tube.

21. The apparatus of claim 15, wherein said apparatus has a first configuration wherein either
   1) said first end of said compression member does not contact the accepted load or
   2) said second end of said compression member does not contact said overhead building structure, such the resulting compression force is within the rod, and
   a second configuration wherein said rod deforms such that said first end of said compression member contacts the accepted load and said second end of said compression member contacts the underside of the overhead building structure, and such that at least some of the resulting compression force is within the compression member.

22. The apparatus of claim 21, wherein said second configuration includes the deformation of said rod resulting from the movement of the accepted load toward the overhead building structure.

23. The apparatus of claim 15, where, said compression member has a cross-sectional shape of a c-channel or a hollow cylinder.

24. The apparatus of claim 15, where said compression member includes mechanism to adjust the length between said first end and said second end.

25. The apparatus of claim 24, wherein said mechanism includes a mechanism one of said first end or said second end.

26. The apparatus of claim 24, wherein said mechanism includes a mechanism at said first end and said second end.

* * * * *